(12) United States Patent
Lavian et al.

(10) Patent No.: US 7,039,724 B1
(45) Date of Patent: May 2, 2006

(54) PROGRAMMABLE COMMAND-LINE INTERFACE API FOR MANAGING OPERATION OF A NETWORK DEVICE

(75) Inventors: Tal Isaac Lavian, Sunnyvale, CA (US); Robert F. Jaeger, Silver Spring, MD (US)

(73) Assignee: Nortel Networks Limited, (CA)

( * ) Notice: Subject to any disclaimer, the term of this patent is extended or adjusted under 35 U.S.C. 154(b) by 810 days.

(21) Appl. No.: 09/753,017

(22) Filed: Dec. 29, 2000

Related U.S. Application Data

(63) Continuation-in-part of application No. 09/522,332, filed on Mar. 9, 2000.

(51) Int. Cl.
*G06F 15/16* (2006.01)
*G06F 15/177* (2006.01)

(52) U.S. Cl. .................. 709/250; 709/208; 709/220; 709/221; 709/222; 710/110; 707/1

(58) Field of Classification Search ........ 709/220–222, 709/208; 710/110; 707/1
See application file for complete search history.

(56) References Cited

U.S. PATENT DOCUMENTS

| | | | |
|---|---|---|---|
| 5,617,527 A * | 4/1997 | Kressin et al. .............. | 715/840 |
| 5,701,488 A * | 12/1997 | Mulchandani et al. ...... | 717/128 |
| 5,892,950 A * | 4/1999 | Rigori et al. ................ | 717/146 |
| 6,199,133 B1 * | 3/2001 | Schnell ........................ | 710/110 |
| 6,625,590 B1 * | 9/2003 | Chen et al. .................... | 707/1 |
| 6,661,800 B1 * | 12/2003 | Hayama et al. ............. | 370/403 |
| 6,662,221 B1 * | 12/2003 | Gonda et al. ................ | 709/223 |
| 6,665,714 B1 * | 12/2003 | Blumenau et al. .......... | 709/222 |
| 6,724,408 B1 * | 4/2004 | Chen et al. .................. | 715/853 |

* cited by examiner

*Primary Examiner*—Kim Huynh
*Assistant Examiner*—Angel L Casiano
(74) *Attorney, Agent, or Firm*—McGuinness & Manaras LLP

(57) ABSTRACT

A method of managing a network device, includes providing a command-line interface application programming interface (CLI-API) compatible with a command-line interface (CLI) of the network device, receiving instructions from an application that calls one or more routines in the CLI application programming interface, and generating at least one command in response to receiving instructions from the application wherein the at least one command is compatible with the CLI of the network device. An apparatus includes a remote serial command-line interface (RS-CLI) device having a storage device capable of storing instructions, a network port capable of being connected to the network and capable of processing a network protocol stack in addition to receiving the instructions, a serial port capable of processing a serial protocol and capable of being connected to the non-application enabled network device, and a processor capable of processing instructions stored in the storage area of the RS-CLI device.

15 Claims, 11 Drawing Sheets

PROGRAMMABLE COMMAND-LINE INTERFACE API FOR MANAGING OPERATION OF A NETWORK DEVICE

This application is a continuation-in-part and claims priority from U.S. application Ser. No. 09/522,332, entitled METHOD AND APPARATUS FOR ACCESSING NETWORK INFORMATION ON A NETWORK DEVICE, filed Mar. 9, 2000.

TECHNICAL FIELD

This invention generally relates to performing network management remotely on network devices connected to a network.

BACKGROUND

Computer networks are becoming increasingly complex and difficult to manage. This is driven in part by the ever-increasing variety of network devices, computers, and software being combined together to integrate large enterprise-based intranets with the Internet. Network management tools have been produced to monitor these combinations of hardware and software and help troubleshoot network failures when they occurred.

Traditional network management tools use a protocol called simple network management protocol (SNMP) to monitor network devices such as routers, switches, hubs, remote access devices, or even computers in a network. The protocol used to interface with SNMP includes rudimentary commands to operate on data such as to "get" a variable, "set" a variable, or "test" a variable.

Having just a few simple commands can make it difficult to perform network management tasks. Specifically, it can be difficult using these basic commands to develop sophisticated network management applications to monitor and troubleshoot a network. Each task may need to be customized to the parameters and capabilities of each network device. Further, a network management task sending combinations of these commands to one or more network devices connected to the network may wait a significant period of time for all the necessary results to be returned. Network delays can be caused by network congestion and the unique processing bottlenecks associated with each network device.

Network management tasks must also be performed securely to prevent accidental or even malicious interlopers from altering network configurations and operation. The most widely used SNMP based networks do not provide the appropriate levels of security because commands are transmitted in the "clear". Confidential information such as a community string and private string can be captured and used to gain access to networks. Further, sensitive business information transmitted in the course of an electronic business transaction can also be captured and misused for monetary gain. Advanced versions of SNMP such as SNMP Version 3 provide a degree of security but have not been widely adopted and therefore cannot be relied on.

It is also difficult to manage networks having network devices from different vendors and with different capabilities. Each network device generally requires the network administrators managing the network to have special network management training. Additionally, the interface used to manage the network devices may also hinder effective network management practices. For example, some network devices can only be managed using a terminal connected to a serial port on the network device while others can be managed by logging into the network device over a network connection using telnet, rlogin, or other remote login services. Often the network devices receiving commands over the serial interface implement proprietary command-line interfaces (CLI) and commands only accessible by a user entering commands on the serially attached terminal. Unfortunately, these command-line interfaces (CLI) are not standard and require the network administrators to learn and use different commands and network management methods.

SUMMARY

In one aspect of the present invention, a method of managing a network device, includes providing a command-line interface application programming interface (CLI-API) compatible with a command-line interface (CLI) of the network device, receiving instructions from an application that calls one or more routines in the CLI application programming interface, and generating at least one command in response to receiving instructions from the application wherein the at least one command is compatible with the CLI of the network device.

In another aspect of the invention, a network having network management capabilities, includes a non-application enabled network device having a CLI capable of controlling one or more network management aspects of the non-application enabled network device, and an application-enabled network device capable of executing applications that use a CLI-API to generate one or more commands compatible with the non-application enabled network device CLI and transmits the one or more commands to the non-application enabled network device over the network for execution.

Yet another aspect of the invention is a remote serial CLI (RS-CLI) device having a storage device capable of storing instructions, a network port capable of being connected to the network and capable of processing a network protocol stack in addition to receiving the instructions, a serial port capable of processing a serial protocol and capable of being connected to the non-application enabled network device, and a processor capable of processing instructions stored in the storage area of the RS-CLI device that at least generates commands compatible with a CLI of the non-application enabled network device in response to processing the instructions stored in the storage area.

Another aspect of the invention includes a method of managing a network device that receives an application having instructions compatible with a CLI application programming interface (CLI-API) configured to work with a CLI of the network device, creates CLI commands capable of controlling the network device in response to processing one or more of the instructions compatible with the CLI-API, transmits the CLI commands created by the CLI-API over a network to the network device, and processes the CLI commands on the network device.

In the various aspects of the invention and where appropriate, Java object-oriented applications and applets are executed that manage one or more network devices over the network. The instructions in these applications and applets generate command-line interface (CLI) commands through the CLI-API to manage the network devices.

The details of one or more embodiments of the invention are set forth in the accompanying drawings and the description below. Other features of the invention will be apparent from the description and drawings, and from the claims.

DESCRIPTION OF DRAWINGS

The accompanying drawings, which are incorporated in and constitute a part of this specification, illustrate an embodiment of the invention and, together with the description, serve to explain principles of the invention.

DETAILED DESCRIPTION

Systems and methods described herein are used to distribute network management tasks to one or more network devices connected to a network. A network application distributed to each network device collects relevant network parameters from each network device and transmits the results back to a central NMS or to other network devices on the network for further analysis. Each network application can be programmed to perform a series of operations using an object-oriented programming language such as Java. The network application interfaces on each network device provides an application programming interface (API) compatible with the particular programming language. This API is compatible with legacy network management protocols such as simple network management protocol (SNMP) and, therefore, can be adapted to work with a wide range of legacy compatible devices.

Tools used to generate the API consistent with the present invention include a management information database (MIB) to object-oriented software compiler and a MIB map. The compiler uses existing MIB information to generate an object oriented MIB interface to the underlying MIB information collected on each network device. The compiler also generates a MIB map to determine if access to the MIB information is made directly to the storage location of the MIB database or through a network address and network management protocol associated with the network device.

Figure 1:
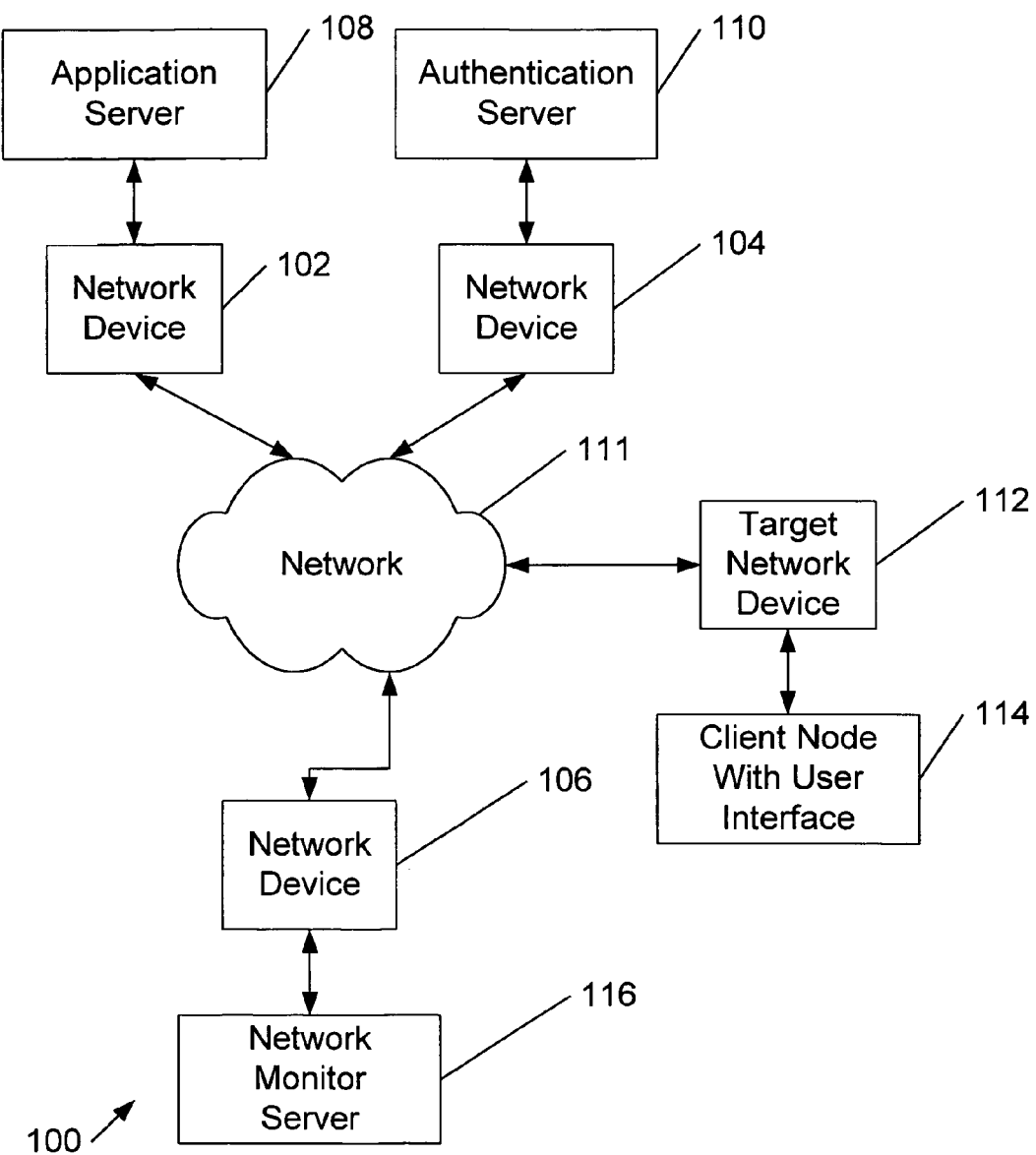
FIG. 1 is a block diagram of an example network.

FIG. 1 illustrates an exemplary communication system 100 including a network device 102, a network device 104, a network device 106, and a target network device 112. Network devices 102, 104, 106, and target network device 112 includes switches, routers, hubs, and similar devices capable of processing fixed-length or variable-length packets in a network.

Network device 102 facilitates the transfer of applications from an application server 108 to the other network devices and nodes on the network. Server 108 provides applications that can execute directly on network devices 102–106 and target network device 112. The variety of network applications available for downloading from application server 108 increases the network management capabilities of each network device. For example, application server 108 may provide an application to a network device that enables the device to filter network traffic containing data packets generated from activities not critical to business, such as browsing the Internet. The resulting increase in bandwidth can be used for more critical business needs.

Network device 104 enables authentication server 110 to authenticate downloading of applications from application server 108 to other network devices within communication system 100. Authentication server 110 can identify a network device on the network and determine if that device should or should not receive a particular application. For example, authentication server 110 may authenticate a particular application and determine if the application should be downloaded to a network device in communication system 100. This feature could be used to prevent introduction of viruses or other unauthorized software onto the network. Additionally, authentication server 110 may also determine if a network device within communication system 100 has proper authorization to download an application.

Network device 106 facilitates communication between a network monitor server (NMS) 116 and other network nodes and processes within communication system 100. Traditionally, an NMS will send network commands to the network devices and, in return, receive input from the network devices, including network parameters. This traditional approach to network management requires NMS 116 to perform a majority of the processing for network management. In contrast, system 100 distributes processing to the network devices that are in communication with the network. This reduces the processing load and frees up NMS 116 so that it can process more critical tasks. For example, network device 102 may monitor network traffic between it and network 111 to reduce the processing load on NMS server 116. In such a case, NMS 116 might receive a notification from network device 102 when device 102 detects that the network bandwidth has exceeded a predetermined threshold.

Target network device 112 depicts an example network device monitored by either a user or central NMS 116. The client node user interface 114 allows the user to perform network management tasks that execute directly on target network device 112. NMS 116 is used to monitor larger and more frequent management tasks dealing with groups of network devices or the overall network. For example, NMS server 116 can execute software agents on different network devices and monitor overall traffic being processed by a group of network devices connected to the network.

Figure 2:
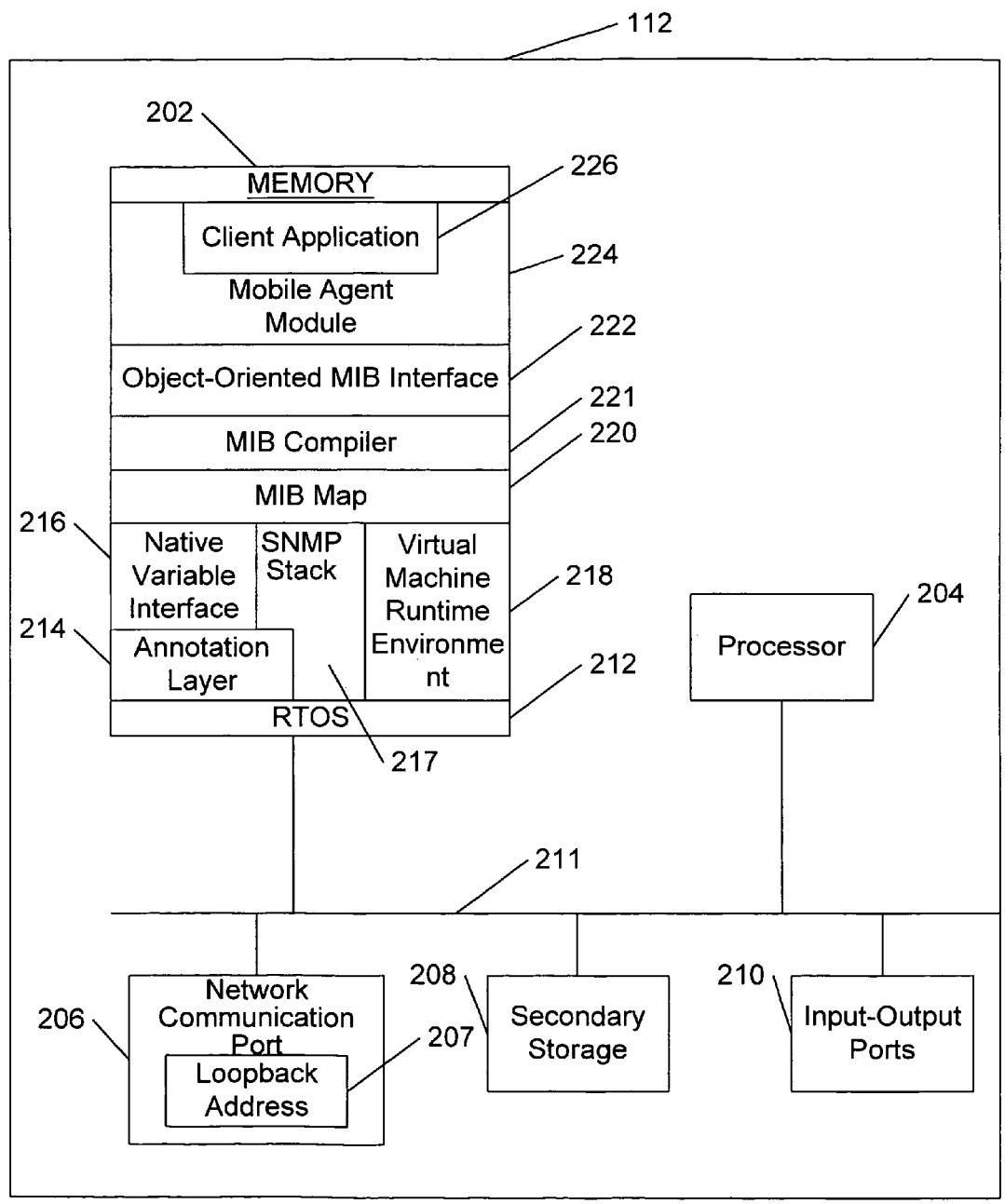
FIG. 2 is a block diagram example of a network device architecture.

FIG. 2 illustrates an architecture used, for example, on target network device 112 and compatible with the network management system. In this example, target network device 112 includes a memory 202, a processor 204, a network communication port 206, a secondary storage 208, and input-output ports 210 in communication with each other over a bus 211. Although the example architecture depicted in FIG. 2 includes specific components, alternate embodiments can be implemented using additional or fewer components than used in this example while remaining compatible with the network management system. The specific components used in the architecture for target network device 112 can vary depending on the specific functions to be performed and design decisions made for the particular implementation.

Network communication port 206 is compatible with a variety of physical and logical network protocols including, for example, TCP/IP and Novell NetWare. A loop back address 207 enables network management applications executing on target device 112 to access local storage areas and resources using the local network protocol stack and local network parameters rather than accessing the storage area on the network device directly. By using the network protocol stack, network applications can access network parameters on a local device and a remote device in a uniform manner. For example, a network management application executing on target network device 112 can access network parameters associated with a remote network device or a local network device through network communication port 206 by specifying either the network address of the remote network device or the local device respectively. Specifically, the network management application executing on the local device can access network parameters of the local network device by specifying loop back address 207. In effect, loop back address 207 provides indirect access to the network parameters of the local device through the network protocol stack.

Secondary storage 208 may include a disk drive, CD-ROM, or any other storage device used by target network device 112. Input-output ports 210 include physical connections for terminals, printers, pointing devices, keyboards, or any other device useful for configuring, operating, or controlling target network device 112.

During execution of one embodiment, modules in memory 202 include a real time operating system (RTOS) 212, an annotation layer 214, a native variable interface 216, a simple network management protocol (SNMP) stack 217, a virtual machine runtime environment 218, a management information database (MIB) map 220, a MIB compiler 221, an object-oriented MIB interface 222, a mobile agent module 224, and a client application 226. Alternate embodiments of the invention can include additional or fewer modules depending on the specific functions required for operation and the design decisions made to implement the invention. For example, RTOS 212 provides improved performance on target network device 112 by executing instructions as they arrive without interruption or delay. However, if the design allows for a reasonable delay while processes are preempted and swapped out of memory, then a general-purpose operating system may be used in lieu of RTOS 212. The general-purpose operating system may also be used if it is less costly to implement than the real-time system and compatible with a wider variety of existing software packages.

Annotation layer 214 provides an interface between applications accessing the MIB database associated with a network device and the actual storage locations for the MIB database on the network device. This layer is necessary because different hardware devices tend to store the underlying MIB database information in different locations on the network device. For example, one network device may store port speed address in a central lookup table of RAM while other network devices may store the port speed addresses for each port on separate ASIC chips associated with each port. Using annotation layer 214, an application can request MIB database information without specifying the actual location of data on the network device.

SNMP stack 217 implements a network management protocol used by different networks to exchange network management information while monitoring network communication. Typically, SNMP stack 217 exchanges network information with other nodes on the network through messages called protocol data units (PDUs). The PDUs contain variables with titles and values and are generally capable of "getting" network parameters, "setting" network parameters, or "testing" for network events occurring on network devices. For example, SNMP stack 217 may transmits a PDU to a remote network device to determine if the remote device has a terminal attached to it. If the terminal is attached to the remote network device, SNMP stack 217 will receive back a PDU containing information that may identify and describe the specific terminal. Each PDU typically includes a variable title and a value of the variable.

Native variable interface 216 provides direct access to underlying SNMP data stored on a network device. Each device on the network requires a different native variable interface 216 customized to the specific features of the device hardware and software. As new network devices are produced or added to a network, a new interface 216 is customized to the specific hardware and software requirements. While this customization process increases the research and development costs, it also increases the efficiency associated with retrieving network parameters from a network device because the information is accessed directly.

Alternatively, network parameters may also be retrieved using SNMP stack 217 and loopback address 207. This eliminates the need for native variable interface 216 and reduces the corresponding costs associated with developing the native variable interface. In lieu of accessing the network parameters directly, a network management application submits requests to loopback address 207 of a network device. Within the requests are SNMP compatible commands formulated to retrieve the desired network parameters. Local processes on the network device monitoring loopback address 207 pass the request to SNMP stack 217 which, in turn, accesses the network parameters as requested. The same local processes then return the resulting network parameters back through SNMP stack 217 and through loopback address 207 and back to the network management application requesting the information.

Virtual machine runtime environment 218 processes object-oriented instructions for execution on processor 204, and may include a virtual machine (VM) and a corresponding development kit (DK) having object-oriented class libraries. The VM simulates a processor and executes on many different hardware platforms. Instructions from a variety of applications are interpreted by the VM and executed on processor 204. One virtual machine run time environment 218 includes a Java virtual machine (JVM) and the Java foundation classes. The Java virtual machine is one type of virtual machine that promotes platform independent computing using the Java programming language.

In operation, MIB map 220 facilitates converting object-oriented requests for MIB information into requests for network parameters either through SNMP stack 217 or native variable interface 216. MIB map 220 determines how network parameters in a MIB should be accessed for different types of network devices. For example, MIB map 220 can be implemented with a table that converts requests for network parameters through native variable interface 216 or SNMP stack 217 into a series of object-oriented method calls. The map includes a database listing the network parameters related to the management of a network device and a set of object-oriented methods for manipulating the network parameters. MIB map 220 maps requests for network parameters from a set of operations to access and manipulate the network parameters to a database having the actual network parameter information. Each request for a network parameter may invoke one or more object-oriented methods depending on the complexity associated with retrieving and processing the data.

If a new type of network device is added to the network, MIB map 220 will initially access the network parameters using SNMP stack 217 and loopback address 207 in the manner previously discussed. This allows a network management device to access network parameters on an SNMP compatible network device using existing SNMP features built into the network device. Once a native variable interface 216 is developed for the network device, MIB map 220 can be reconfigured to access network parameters through the faster and more efficient native variable interface 216.

Object-oriented MIB interface 222 provides an interface for applications to access MIB information using object-oriented classes and methods. Initially, a MIB compiler 221, discussed in further detail below, receives a list of MIB variables and generates the classes and method found in the object-oriented MIB interface 222. At least two types of variables—scalar variables and table variables—are accessible through object-oriented MIB interface 222. A scalar variable is a single variable with an identifier that identifies the variable and a value associated with the variable. If an application requests a scalar variable, object oriented MIB interface 222 returns an object-oriented instance of that scalar variable. For example, a network management application may request a scalar variable identifying the number of resent packets on the network device. Alternatively, object-oriented MIB interface 222 may request a table of information from the underlying SNMP layer. In response, the underlying SNMP layer would provide an object table and corresponding methods for accessing each of the entries within the table. As an example, one type of object table may include a list of network addresses associated with network devices in a subnet and methods for an application to manipulate the entries in such a table.

Mobile agent module 224 provides a framework for executing a variety of mobile agents. Client application 226 represents one such mobile agent application as illustrated in FIG. 2. Accordingly, mobile agent module 224 interfaces between the mobile agent and the underlying execution environment, thus allowing a mobile agent to operate on a variety of network devices and operating environments.

For example, mobile agent module 224 implemented in accordance with the Java Bean™ application-programming interface defines a portable, platform-neutral set of APIs for software components to communicate with each other in accordance with the Java Beans conventions. In addition, mobile agents implemented using Java Bean components are able to plug into other component architectures, such as Microsoft's COM/DCOM/Active X architecture. In this capacity, mobile agent module 224 acts as a bridge between mobile agents developed using Java Beans and other component object models or component architectures. For example, mobile agent module 224 may receive Java instructions from client application 226 and convert them into instructions compatible with the COM/DCOM/Active X environment or alternatively, may convert these same Java instructions into byte codes to run on a virtual machine in virtual machine run time environment 218. It should be appreciated that client application 226 may be any type of network management application designed for execution on target network device 112.

Figure 3:
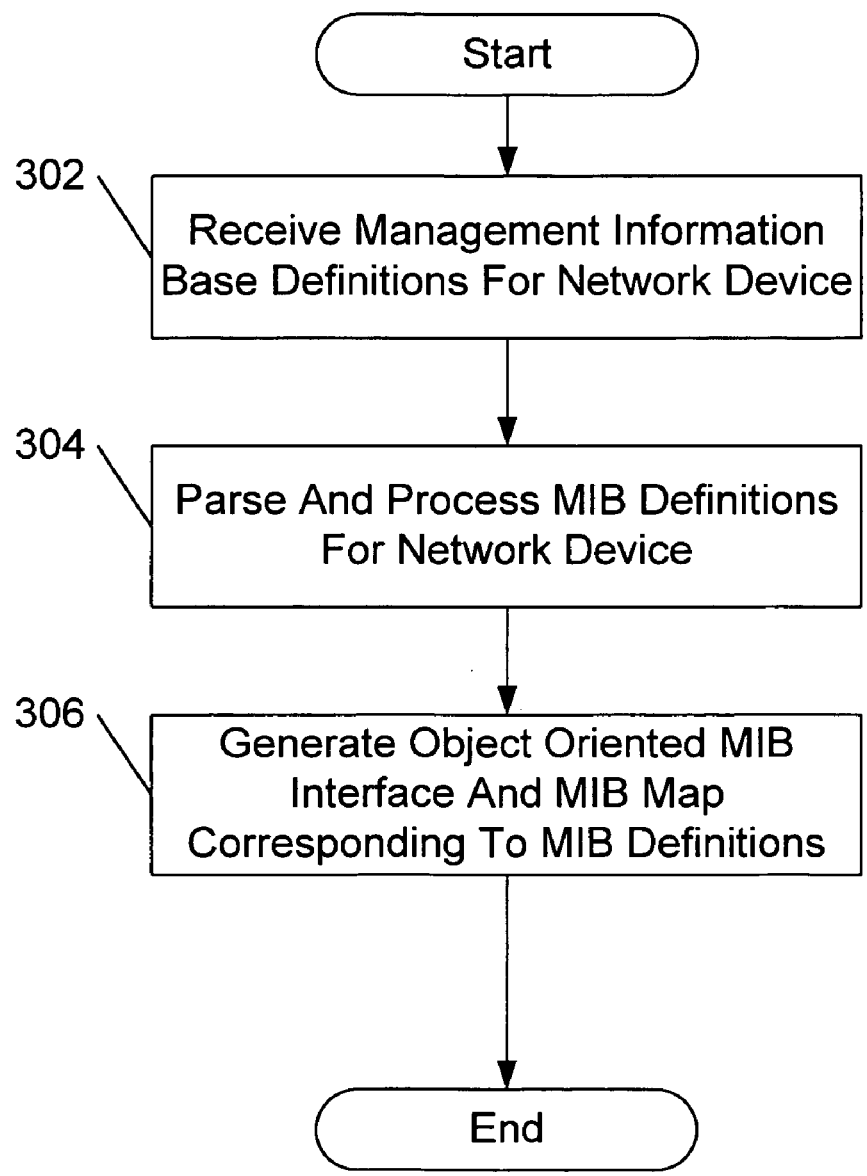
FIG. 3 illustrates the operations used in one embodiment to convert network parameters for a network device into an object-oriented compatible interface for accessing those network parameters.

FIG. 3 illustrates the operations for generating an interface to MIB information from an object-oriented application. MIB compiler 221 generates object-oriented MIB interface 222. Initially, MIB compiler 221 receives MIB definitions for a network device (302). These definitions may be stored in a database as a series of identifiers and corresponding values sufficient to describe the network parameters associated with a particular network device. Each network device may have a unique MIB definition depending on its capabilities and operating characteristics. Common MIB definitions, however, are arranged in a predetermined hierarchical order as illustrated in FIG. 4 and described below.

Next, MIB compiler 221 extracts network parameters for the specific network device from the MIB definitions (304). This involves lexically recognizing and parsing each token in the MIB definitions for the network device. MIB compiler 221 then generates an object-oriented MIB application-programming interface or MIB interface and MIB map 220 corresponding to the MIB definitions (306). The object-oriented MIB interface creates classes corresponding to the MIB hierarchy and methods for accessing each of the variables in the MIB definition. MIB map 220 assists in mapping object-oriented class definitions and method calls into corresponding combinations of SNMP primitives (e.g., get, set, and test) used by SNMP stack 217 or native variables.

Figure 4:
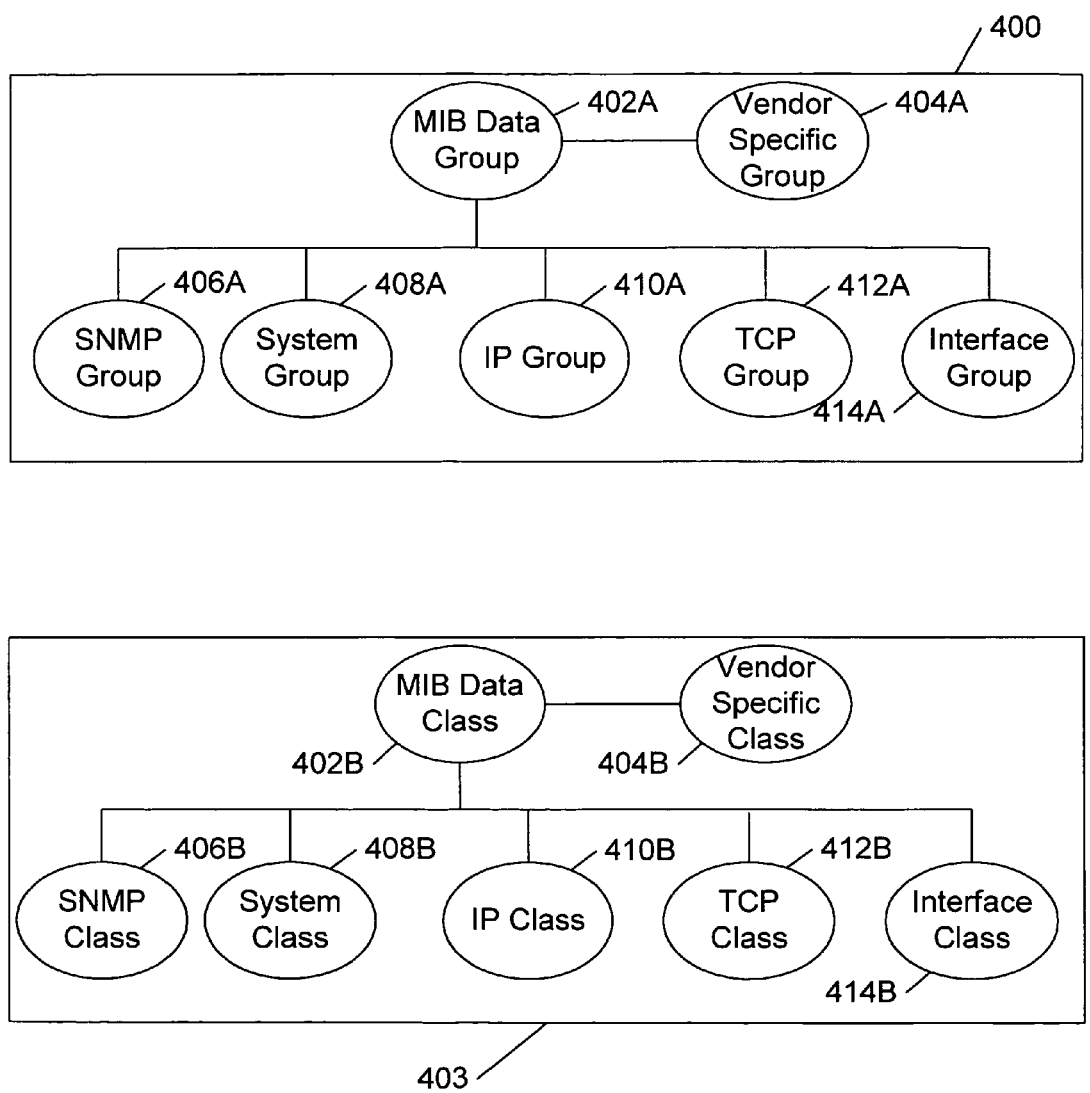
FIG. 4 depicts the relationship between a management information database (MIB) and the corresponding object-oriented MIB classes in one embodiment.

FIG. 4 illustrates an exemplary mapping from MIB definitions 400 to corresponding MIB classes 403 and object-oriented methods. For example, MIB definitions 400 may include a MIB data group 402A, a vendor specific group 404A, an SNMP group 406A, a system group 408A, an IP group 410A, a TCP group 412A and an interface group 414A, to name a few. These MIB information groups define how network information is organized and can be addressed on a network device. These specific groups contain network information organized according to industry standards.

For example, vendor specific group 404A includes an area that vendors can define their own network parameters and proprietary information. SNMP group 406A includes definitions for protocol data units (PDUs) used for network nodes to communicate. IP group 410A includes information corresponding to the network communication layer. For example, IP group 410A may include the IP address of a network device and nearby routers or switches. TCP group 412A, which includes information corresponding to the transport protocol layer, may include a list of all active connections communicating using a "socket" interface as well as the ports and corresponding services.

MIB compiler 221 in FIG. 2 receives the MIB definitions 400 in FIG. 4 in a database that lists the network parameters related to the management of a network device. MIB compiler 221 converts these MIB definitions 400 into corresponding MIB objects 403 including data class 402B, vendor's specific class 404B, SNMP class 406B, system class 408B, IP class 410B, TCP class 412B, and interface class 414B. Through this conversion, MIB compiler 221 then creates the methods an application can use to access network parameters in the MIB database corresponding to the classes.

In operation, an object-oriented network management application is downloaded into a network device accesses the MIB database through the object-oriented interface.

Figure 5:
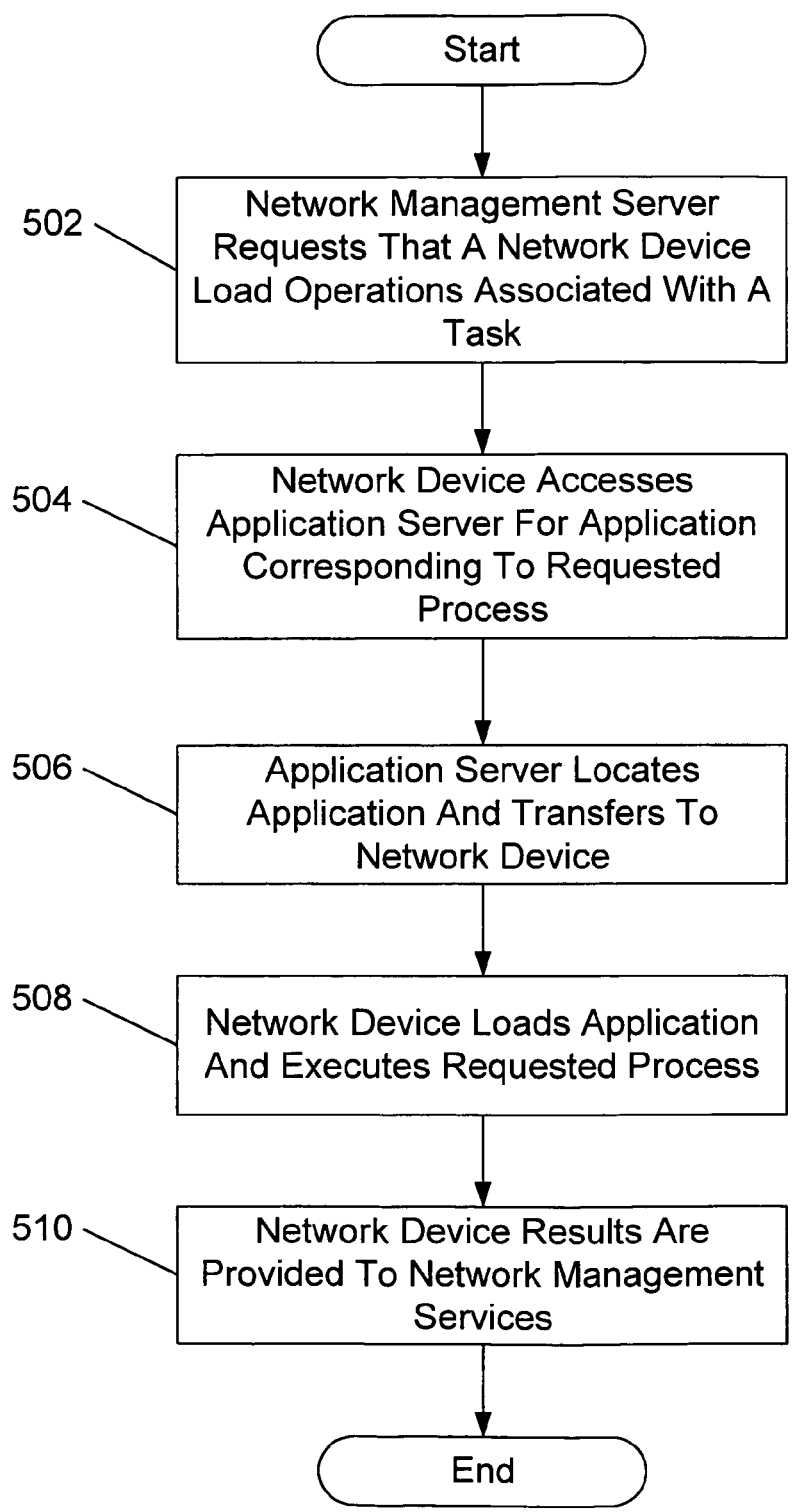
FIG. 5 illustrates the operations a network management server (NMS) performs to gather network parameters from a network device.

FIG. 5 illustrates the operations used by a NMS to manage a network device. Initially, the NMS requests that a network device load a set of operations associated with a particular task (502). This offloads a portion of the network management processing to the target network devices and frees up the NMS to handle other requests. In addition, this reduces network traffic caused by sending numerous PDUs with SNMP messages.

In response to the request to load a set of operations, the network device accesses an application server having the application(s) capable of performing the set of operations associated with the task (504). For example, an application server 108 as shown in FIG. 1 stores hundreds of network applications ready for execution on target network device 112. Application server 108 receives the request, locates the application, and then transfers it to the appropriate network device (506). In one implementation, application server 108 transfers a network application from application server 108 to the network device each time or session the network device executes the application. Alternatively, an application may remain resident in a network device permanently or for a given period of time once it is initially downloaded from the application server.

The network device loads and executes the requested application (508). Using the application, the network device may perform a variety of network management functions. For example, the network device may be asked to monitor network traffic on a nearby network and notify the central NMS when a node on the network becomes inactive or the network traffic increases beyond a particular threshold.

Once the information or results are generated, the network device provides information back to the NMS for processing (510). If a central NMS is not present, the network device may broadcast results over the network to other network devices monitoring and processing the network information.

Figure 6:
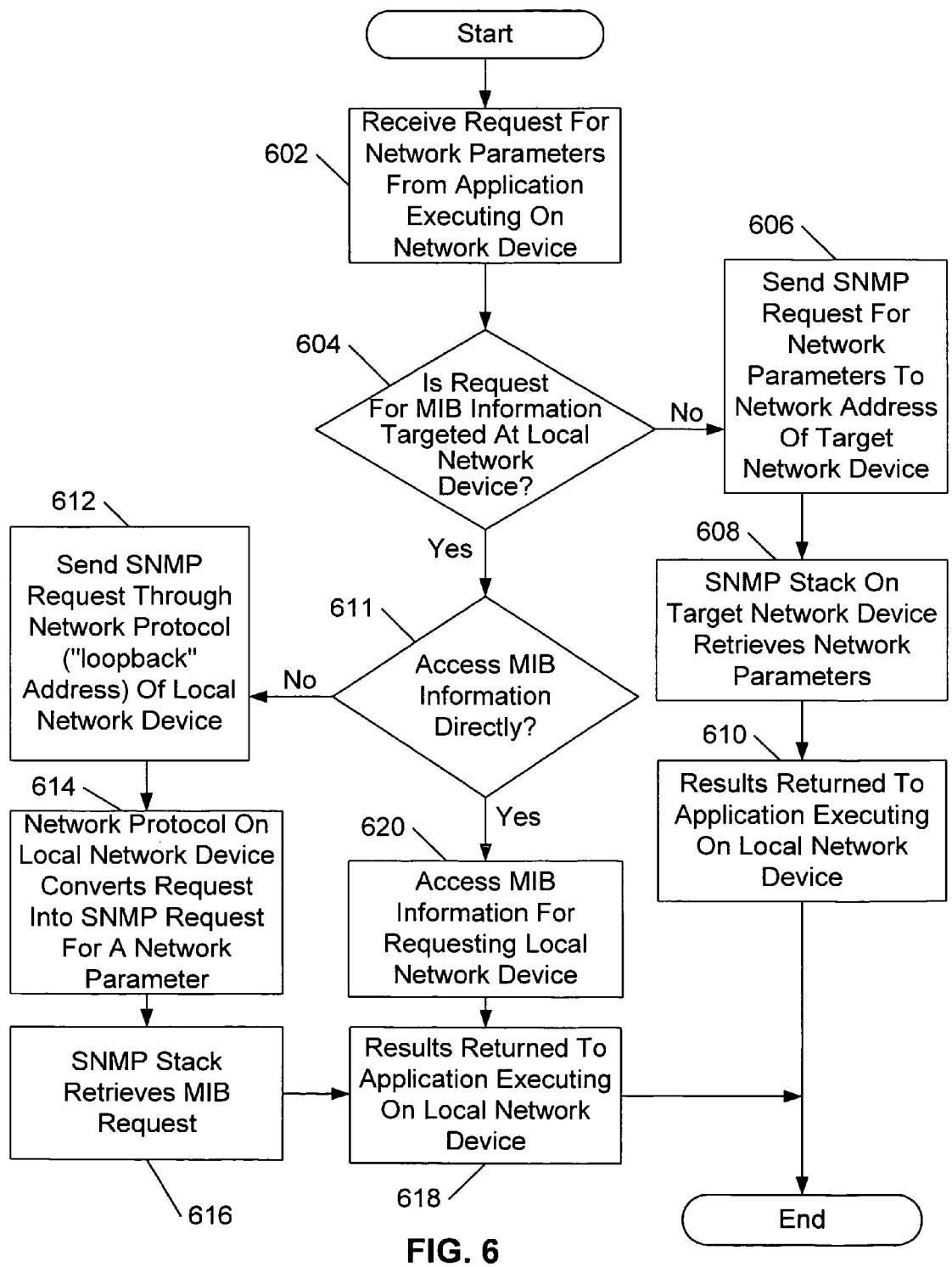
FIG. 6 illustrates the operations used by a network device to gather network parameters.

FIG. 6 illustrates the operations used to access network parameters on a network device consistent with the present invention. Specifically, a network management application such as client application 226 in FIG. 2 executes these operations to access network parameters stored directly on a local network device or to access network parameters stored on a remote network device. By accessing network parameters on a remote device, one network device can act as a proxy for obtaining network parameters from another network device. This is particularly useful if, for example, the remote network device is an older device or otherwise incompatible with features of the present invention. For example, a network management application executing on a local network device can be used to access parameters on a remote network device designed without a virtual machine or that is not capable of executing network management applications designed consistent with the present invention. The network management application can be an object-oriented application written in Java that uses remote method invocation (RMI), JINI, COM/DCOM or other distributed computing mechanisms to process information on a remote computer system. Java, RMI, JINI and derivatives of Java are trademarks of Sun Microsystems, Inc. of Mountain View, Calif. COM/DCOM are products developed by Microsoft of Redmond, Wash.

As shown in FIG. 6, a network management application initially begins execution on a local network device. The network management application executing on the local network device requests a network parameter typically found in the MIB (602). For example, a network management application may request MIB information corresponding to the current count and the cumulative count of packets being transmitted to determine if the capacity of a network device has been met or exceeded.

The network management application then determines if the requested network parameter is associated with the local network device or a remote network device (604). If the network parameter is associated with a remote network device, the network management application forms and sends a request for the network parameter to the remote network address of the network device (606). For example, the network management application may request that SNMP stack 217 (see FIG. 2) create a PDU to gather MIB information on the remote device. This request can be formed using an object-oriented programming language such as Java. SNMP stack 217 then transmits the request for a network parameter over the network to the remote network device for processing. A network protocol such as TCP/IP associated with that remote network device receives the request for the network parameter. The SNMP stack on the remote device processes the request and retrieves the requested network parameter, which includes MIB information (608). Once the network parameter is received on a remote network device, the corresponding SNMP stack packages the result into a PDU and sends the results back to SNMP stack 217 for processing by the network application executing on a local network device (610).

If the network management application requests network information associated with the local network device (604), the network management application can access the requested network parameters in at least two different ways. The network management application can access the network parameters on the local network device directly (611) using a software interface customized for the network device (620). For example, the network management application can use a native variable interface to access network parameters on the local network device.

Alternatively, the network management application may access local network parameters on a local network device using existing network protocol. Initially, the network management application sends a request for a network parameter through the network protocol of the local network device using the "loopback" address (612). This loopback address is a self-referential address which identifies the local network device on the network without sending packets of information over the actual network. For example, sending a request to the loop back address establishes a data route directly back to the network protocol stack on the local network device. The network management application essentially uses SNMP stack 217 on the local network device to create a PDU to request the corresponding network parameter (614). SNMP stack 217 then retrieves the requests for the particular network parameter (616). The results are then returned to network management application 226 executing on local network device (618).

Figure 7:
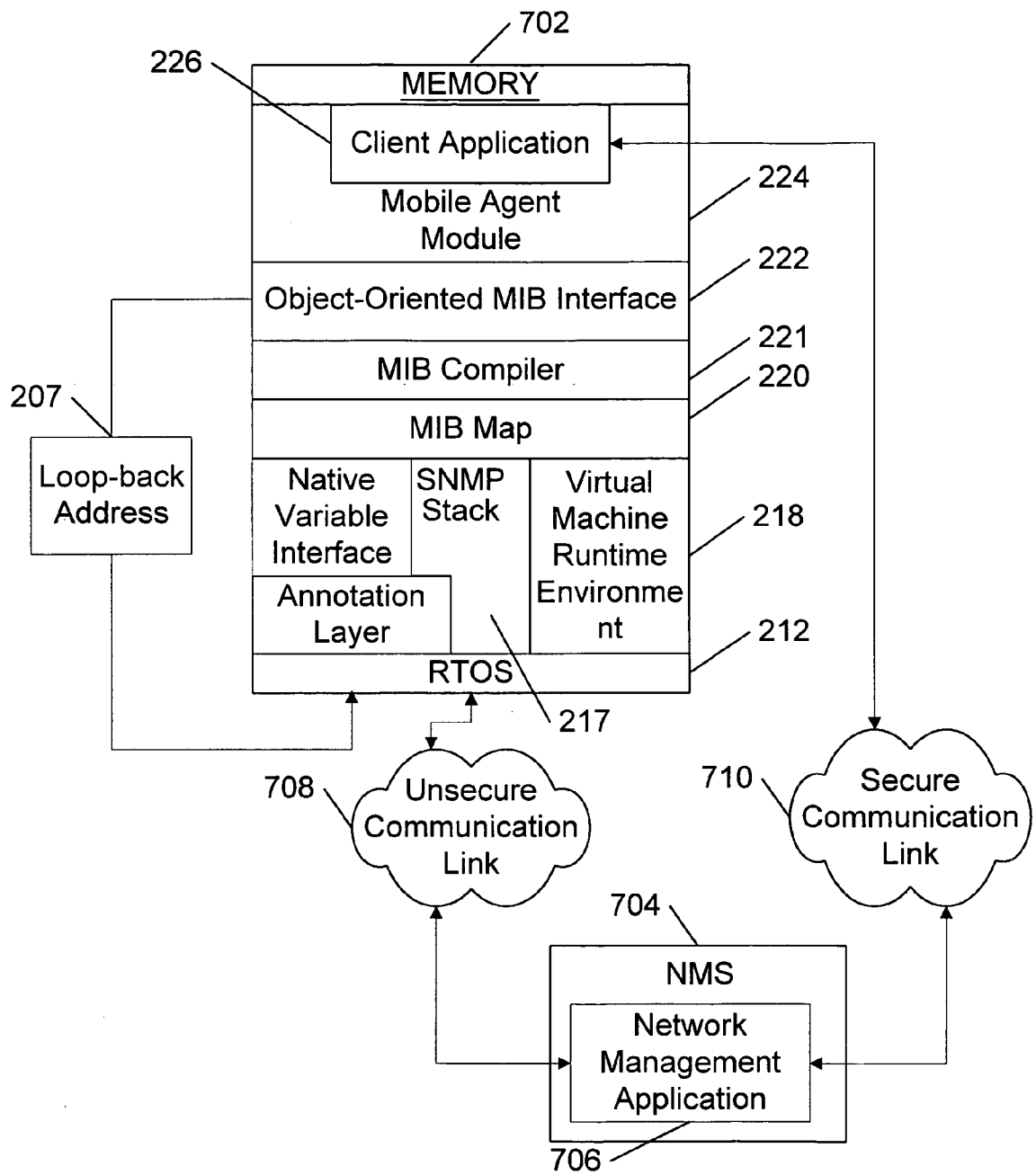
FIG. 7 is a block diagram of a network management server (NMS) securely communicating a network management protocol commands to a network device.

FIG. 7 is a block diagram of a network management server (NMS) securely communicating network management protocol commands to a network device. System 700 in FIG. 7 includes a network device 702 equipped with object-oriented capabilities described above, a network management server (NMS) 704 executing a network management application 706.

Network management application 706 can transmit network management commands over an unsecured link 708 or over a secure link 710 to network device 702. Network management commands transmitted over unsecured link 708 are in the clear and can be easily intercepted and used. This is the typical scenario on most SNMP-based networks because the most common versions of SNMP do not support encryption or other forms of data security. Secure commands transmitted directly to a network management protocol stack such as SNMP 217 can not be decrypted and utilized. As a result, conventional network management routines communicating directly with the network management protocol stack in the clear can result in a breech of the network and system security.

An alternative approach is to communicate over secure communications link 710 to client application 226 running on network device 702. In this approach, network management application 706 can encrypt all information before sending it over the network using an encryption protocol as secure socket layer (SSL) or allowing hardware in secure communications link 710 to encrypt the information. Numerous other methods of sending secure information over the network can also be used.

Client application 702 receives the secured information and extracts the network management routines using an agreed upon decryption method. In addition, client application 702 may even authenticate and authorize the network management application and user transmitting the secured information before applying any decryption methods. These decrypted network management commands are then transmitted through object-oriented MIB interface 222 and loopback address 207 to SNMP stack 217 for processing. Resulting information is returned to network management application over a similar secure channel by reversing the above operations.

Figure 8:
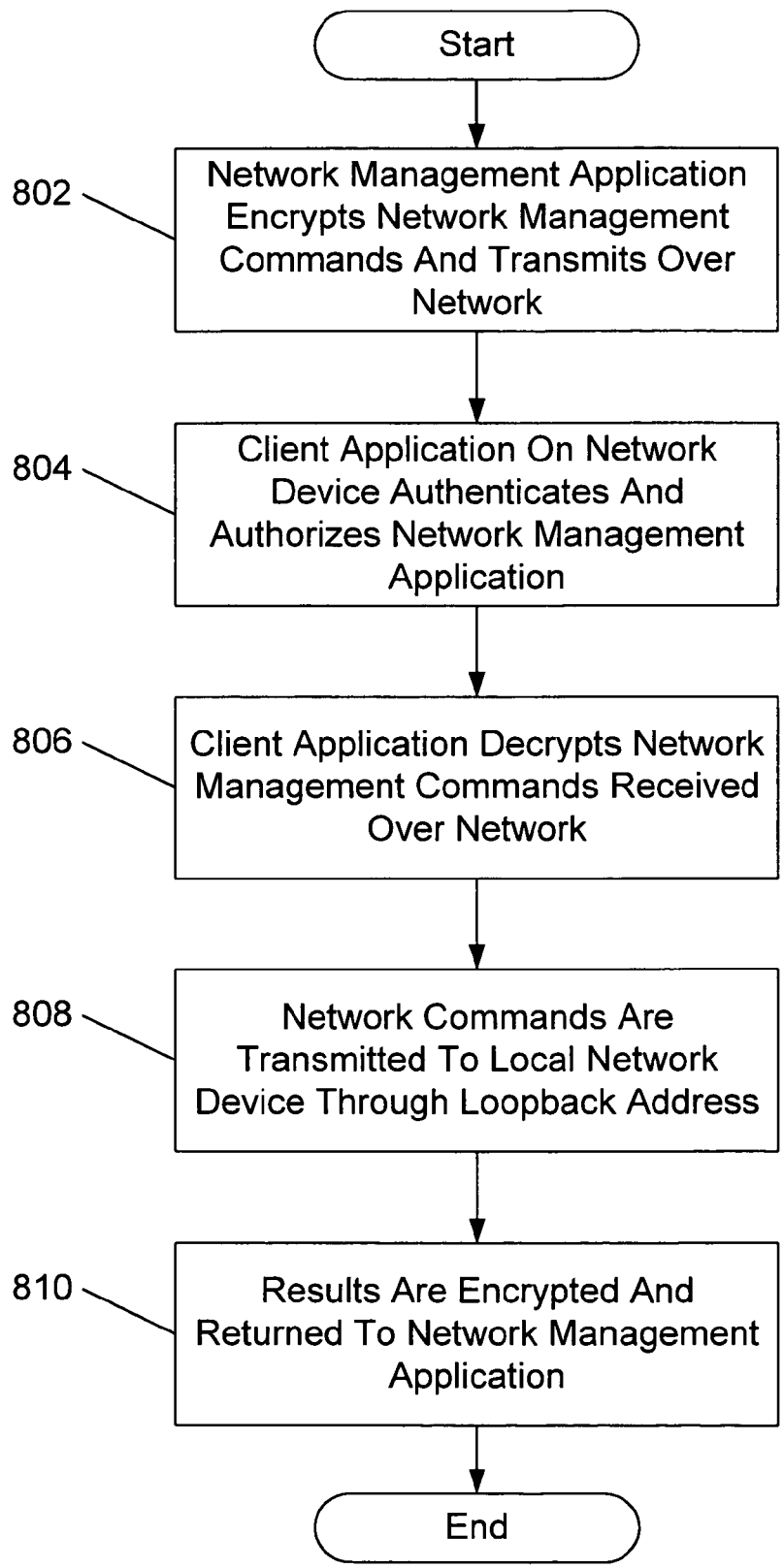
FIG. 8 is a flowchart diagram for securely communicating network management commands to a network device over a network.

FIG. 8 is a flowchart diagram for securely communicating network management commands to a network device over a network. Initially, a network management application encrypts network management commands and transmits them over a network (802). For example, the network management application can use SSL or a public-key encryption scheme to encrypt the data. The client application on a network device receiving the network management commands authenticates and authorizes the network management application (804). This can be accomplished by reading a predetermined segment of the transmission for identification information such as a login and password. Once this information is confirmed, client application decrypts the network management commands transmitted by the network management application (806). Because the client application decrypts the commands, special secure network management protocols such as SNMP Version 3 are not required. This means that any compatible network management protocol can be used and not a specially enhanced version having built-in encryption and security.

The decrypted network commands are then transmitted to the local network device through a loopback address (808). The data transmitted over the loopback address remains secure because the data is transmitted along the backplane of the network device and not over an external network port. In addition, the network management commands are immediately processed by the network management protocol such as the SNMP stack. Results are then returned to the client application on the network device where they are encrypted and returned to the network management application (810).

Figure 9:
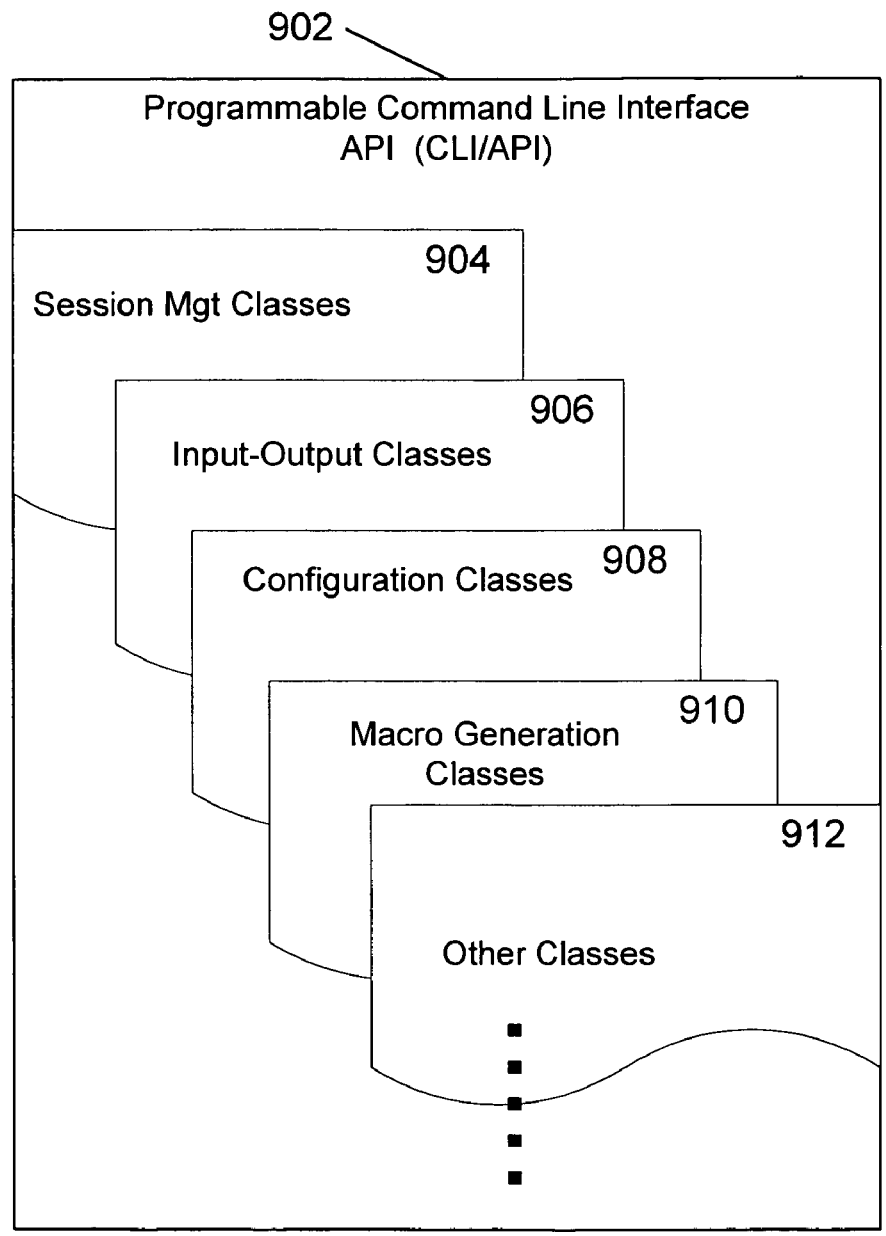
FIG. 9 is a block-diagram illustrating a command-line interface application-programming interface (CLI-API) for a network device.

FIG. 9 is a block-diagram illustrating a command-line interface (CLI) application programming interface (API) 902 for network devices. Access to a conventional CLI on a network device typically occurs through a terminal connected to the serial port of the network device. The user types in commands directly to the network device through this terminal to configure and monitor network device information. This CLI-API instead provides an object-oriented application prong interface for client application 226 in FIG. 2 to develop programmatic interactions with the network device and develop more sophisticated operations. For example, client application 226 can create stateful applications that measure one or more variables on the network device and then make decisions based on the combination of variables. In contrast, the user interfacing with the CLI of a network device cannot easily make such determinations and decisions.

In this implementation, CLI-API 902 includes a set of classes compatible with the Java programming language to perform a variety of functions necessary when communicating over a network or serial link to a command-line interface. These classes include session management classes 904, input-output classes 906, configuration classes 908, macro-generation classes 910, and other classes 912 as needed to interface with the various network devices on a network. Of course, these classes are given only as an example to perform one set of functions and greater or fewer classes may be required depending on the applications specific requirements.

Session management classes 904 control the resources associated with establishing a communication session with a network device through the command-line interface. This may include performing authentication and authorization of the user and application. For example, obtaining a login name, an application identification, and/or a password. It also includes establishing network sessions, obtaining handles to references of the one or more sessions, and relinquishing the resources associated with the network device when the sessions are completed.

Sending and receiving data through the command-line interface occurs through input-output classes 906. Data written to the network device and read from the network device may be buffered and converted into different character sets through the input-output classes 906.

Configuration classes 908 are used to change the operating characteristics of different network devices. Common configuration processes associated with configuring a network device are included in methods defined in configuration classes 908. For example, this can include getting and setting IP address information for the network device, taking a network device up or down, or other typical network device configuration operations.

Macro generation classes 910 allows an application to create and register customized macro routines. For example, an application can be run that sets up numerous macros and stores them in persistent storage on a central server or network device for other applications to use later. This would make it easier to enhance the available functions using the CLI-API with a network device. Other classes 912 represent any other additional classes that client application 226 may use to interact with a network device.

Figure 10:
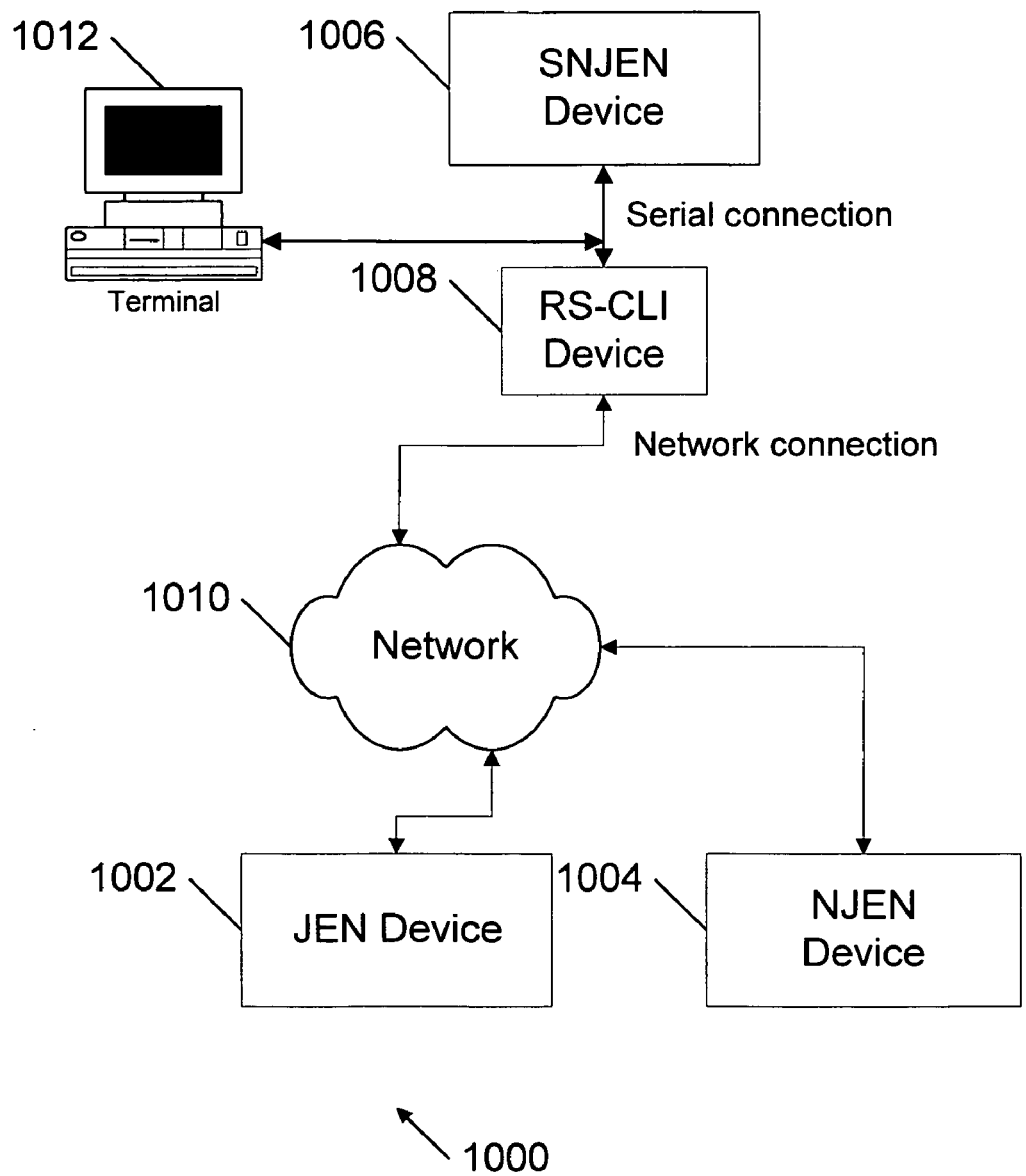
FIG. 10 is a block diagram of a network having network devices capable of transmitting and receiving commands from an application through a CLI-API.

FIG. 10 is a block diagram of a network 1000 having network devices that either transmit or receive commands from an application using the CLI-API described above. Network 1000 includes a Java Enabled Network (JEN) device 1002, a non-Java Enabled Network (NJEN) device 1004, a non-Java enabled network device with serial interface (SNJEN) 1006, a remote serial command-line interface (RS-CLI) device 1008, connected together over network 1010.

JEN device 1002 includes elements described in FIG. 2 and associated with network device 112. Because JEN device 1002 includes a virtual machine, object-oriented applications and byte-codes can be processed. In particular, JEN device 1002 executes object-oriented applications, for example Java object-oriented applications or applets, and transmits commands to other network devices using the CLI-API described above.

In contrast, NJEN device 1004 does not include a virtual machine and other features present in JEN device 1002 and therefore is not able to execute object-oriented applications written in a programming language like Java. NJEN device 1004 can receive commands through the CLI-API interface and send results back through the CLI-API interface to JEN device 1002. These commands can be sent from an application on JEN device 1002 directly to NJEN device 1004 over network 1010.

SNJEN device 1006 is unique in that it cannot process object-oriented applications written in Java or any other high-level programming language and cannot receive command-line instructions over the network. Instead, SNJEN device 1006 can only receive commands over a serial connection. For example, some network devices made by Cisco, Inc. cannot process object-oriented applications and further can only process certain commands received over a serial interface. To overcome this limitation, remote serial-command line interface (RS-CLI) device 1008 has a serial interface to connect to a serial port on SNJEN device 1006 and a network interface to connect to network 1010.

In one implementation, RS-CLI device 1008 includes a serial interface, a network interface, operating system support for an object-oriented language like Java, a virtual machine, a set of object-oriented components and APIs to enable execution of object-oriented applications. A serial interface writer writes CLI commands to the serial interface and serial interface reader reads commands from the serial interface. A CLI generator within RS-CLI device 1008 creates CLI commands to send to the serial port and a corresponding CLI response parser analyzes the results of the CLI commands coming from the network device such as SNJEN device 1006. RS-CLI device 1008 can be fabricated using an inexpensive processor such as a x86 compatible chip, a serial port and driver, a Ethernet port and driver, a storage device having the software described above and a TCP/IP network protocol stack.

In operation, JEN device 1002 sends commands to SNJEN device 1006 through RS-CLI device 1008. RS-CLI device 1008 processes object-oriented commands received over the network and transmits command-line instructions to SNJEN device 1006. This enables even non-Java enable network devices requiring a serial communications line to indirectly process object-oriented instructions. With this type of interface, a single network device like JEN device 1002 can manage a heterogeneous collection of network devices from many different vendors.

Figure 11:
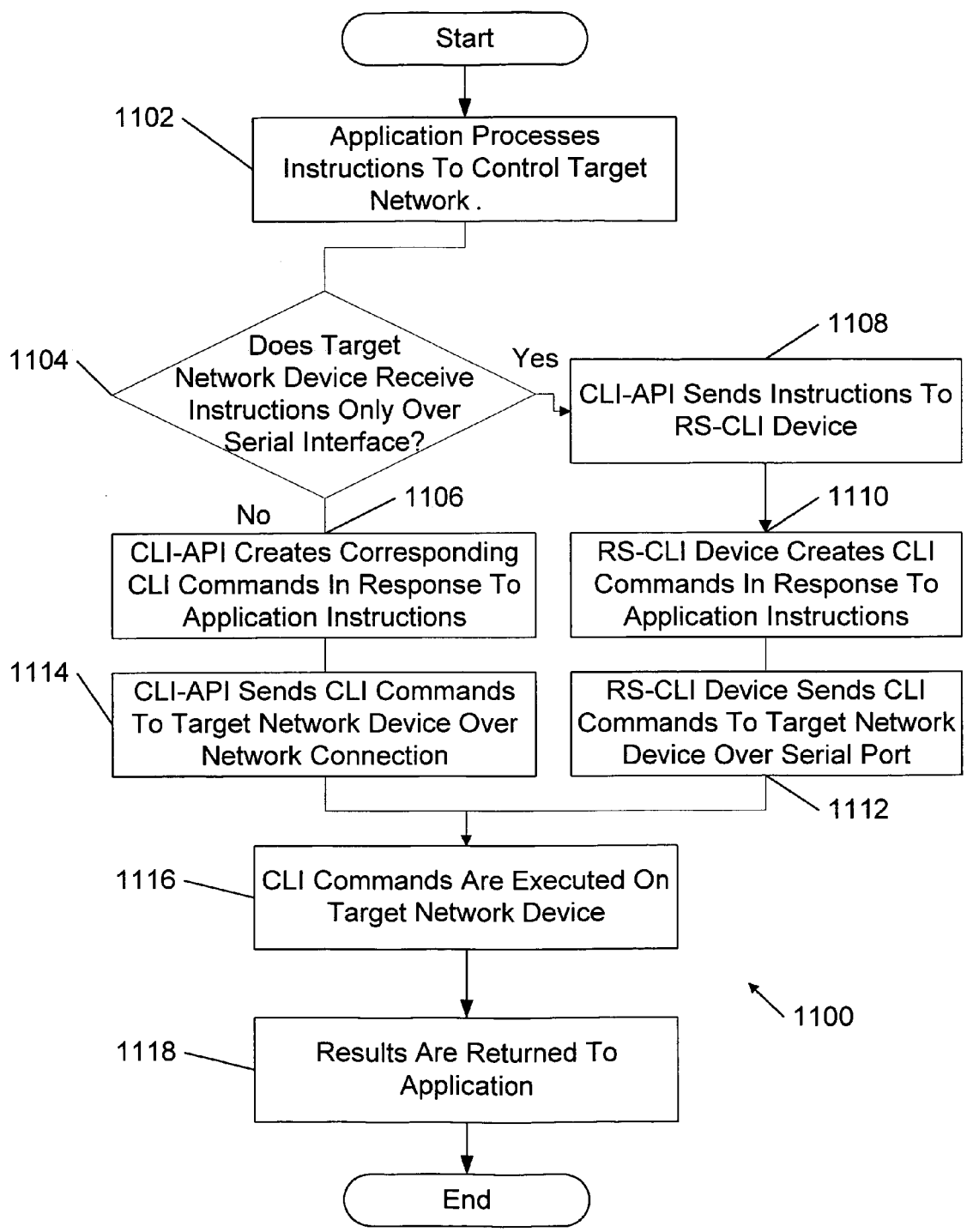
FIG. 11 provides the operations an application performs to manage network devices using CLI-API alone and in conjunction with a remote serial command-line interface (RS-CLI) device.

FIG. 11 illustrates a process 1100 that provides operations an application performs to manage network devices using CLI-API 902 alone and in conjunction with RS-CLI device 1008. An application processes instructions designed to control a target network device (1102). In one implementation, this can be an object-oriented application written in Java executing on a Java enabled network device such as JEN 1002. The target network device can be like NJEN device 1004 which does not execute application instructions (written in Java or any other language) or like SNJEN 1006, which not only does not execute instructions in an application but only receives CLI commands over a serial port and not the network.

The application can include instructions for controlling the configuration of the target network device, gathering information on the network interfaces on the target the target network device, bringing a network device up or down on the network, downloading a new image to the target network device using a network copy command like Trivial File Transfer Protocol (TFTP), or any other set of operations possible using a command-line interface (CLI).

If the target network device accepts CLI commands only over a serial interface (1104), CLI-API 902 directly transmits instructions from the application over the network to the network port on RS-CLI device 1008 attached to the target network device (1108). RS-CLI device 1008 creates corresponding CLI commands in response to application instructions (1110) and transmits them to the target network device over a serial port (1112). For example, RS-CLI device 1008 executes Java object-oriented applications or applets that generate CLI commands. While the application instructions in the Java object-oriented application are standard, the CLI commands generated by RS-CLI device 1008 are specific to the CLI used by the particular network device.

Alternatively, CLI-API 902 creates corresponding CLI commands in response to application instructions (1106). For example, an application executes application instructions on JEN device 1002 that calls CLI-API 902 and generates CLI commands for execution on another network device such as NJEN device 1004. CLI-API 902 then establishes a network session and transmits corresponding CLI commands directly to the target network device (1114). In most cases, CLI-API 902 establishes a session with a target network device using the telnet, rlogin, or other remote login type communication protocols.

The target network device then executes the CLI commands provided through the application (1116). Each CLI command may cause the target network device to operate differently and send back different information. As a result, the CLI commands being generated by the application can change dynamically as the conditions on the target network device change or are modified. Once the target network device executes all the CLI commands, the results are returned to the application for further processing (1118).

While specific implementations have been described herein for purposes of illustration, various modifications may be made without departing from the spirit and scope of the invention. For example, encryption and other security measures can be implemented using software methods as well as specially configured hardware designed to process the data for secure transmission over a communication link. Implementations of the invention can be implemented using an object-oriented programming language such as Java, C++, C#, Eiffel, SmallTalk, or Objective C, a procedural programming language such as "C", or assembly code and various combinations of these languages as used to execute on general purpose processors and processors used within a network devices. With respect to session protocols, remote login protocols such as telnet and rlogin were suggested however many other types of client-server type protocols which achieve the same or similar results could also be adapted to work with implementations of the present invention. Further, although aspects of the present invention are described as being stored in memory and other storage mediums, they can also be stored on or read from other types of computer-readable media, such as secondary storage devices, like hard disks, floppy disks, or CD-ROM, a carrier wave from the Internet, or other forms of RAM or ROM. Accordingly, the invention is not limited to the above-described embodiments, but instead is defined by the appended claims and their full scope of equivalents.

What is claimed is:

1. A method of managing a first network device, comprising:
   loading an object-oriented network management application on a second network device;
   generating at least one command line interface command by the object-oriented application translating at least one non-command line command to the at least one command line interface command; and
   communicating the at least one command line interface command from the second network device to the first network device via a loopback address;
   wherein the application is implemented as one or more object-oriented classes and the one or more routines are method calls in the one or more object-oriented classes; and
   wherein a command-line interface application programming interface ("CLI-API") provides an object-oriented application programming interface for the application to develop programmatic interactions with the network device.

2. The method of claim 1, wherein the one or more object oriented classes and the method calls are compatible with the Java object-oriented programming language.

3. The method of claim 1, wherein the one or more object-oriented classes are selected from a set of classes including a session management class, an input-output class, a configuration class, a macro-generation class, and other classes.

4. The method of claim 1, wherein the at least one command-line interface command is capable of performing one or more network management operations selected from a set of operations including configuring a network device, gathering information on network interfaces on a network device, bringing a network device up or down on a network, and downloading a new image to a network device.

5. The method of claim 1, wherein the programmatic interactions with the network device includes stateful applications operable to measure one or more variables on the network device and make decisions based on the one or more measured variables.

6. A network system having network management capabilities, comprising:
   a non-application enabled network device having a command line interface (CLI) capable of controlling one or more network management features of the non-application enabled network device, a non-application enabled network device being a network device that is not able to process an application written in a high-level programming language; and
   an application-enabled network device capable of executing applications that use a command-line interface application programming interface (CPI-API) to generate one or more commands compatible with the command line interface of the non-application enabled network device and transmit the one or more commands to the non-application enabled network device and transmit the one or more commands to the non-application enabled network device over a network for execution, an application-enabled network device being a network device that is able to process an application written in a high-level programming language.

7. The network system of claim 6, wherein the application-enabled network device is capable of processing object-oriented applications compatible with the Java programming language.

8. A network system having network management capabilities, comprising:
   a non-application enabled network device having a command line interface (CLI) capable of controlling one or more network management features of the non-application enabled network device;
   an application-enabled network device capable of executing applications that use a command-line interface application programming interface (CLI-API) to generate one or more commands compatible with the CLI of the non-application enabled network device and transmitting the one or more commands to the non-application enabled network device over the network for execution; and
   a remote serial command line interface (RS-CLI) device connected between the application-enabled network device and the non-application enabled network device, the RS-CLI device capable of receiving an application over a network from the application-enabled network device, executing the application and producing commands for transmission over a serial connection connected to the non-application enabled network device, wherein the commands are compatible with the CLI on the non-application enabled network device.

9. The network of claim 8, wherein the RS-CLI device comprises,
   a storage device capable of storing an instruction;
   a network port capable of processing a network protocol stack and connected to the network;
   a serial port capable of processing a serial protocol and connected to the non-application enabled network device; and
   a processor capable of processing the instruction stored in the storage area of the RS-CLI device that at least generates a command compatible with a CLI of a network device in response to processing the instruction stored in the storage area.

10. The RS-CLI device of claim 8, wherein the instruction stored in the storage area is from a software component selected from a set of software components including an operating system an object-oriented component, a virtual machine, and a network protocol stack.

11. A remote serial command-line interface (RS-CLI) device comprising:
   a storage device capable of storing an instruction,
   a network port capable of being connected to the network and capable of processing a network protocol stack in addition to receiving the instruction;
   a serial port capable of processing a serial protocol and capable of being connected to the non-application enabled network device; and
   a processor capable of processing the instruction stored in the storage area of the RS-CLI device that at least generates a command compatible with a CLI of the non-application enabled network device in response to processing the instruction stored in the storage area;
   wherein the instruction in the storage area is from a software component stored in the storage area and selected from a set of software components including an operating system, an object-oriented component, a virtual machine, a network protocol stack, and an object-oriented application.

12. An apparatus for managing a non-application enabled network device, a non-application enabled network device being a network device that is not able to process an application written in a high-level programming language, the apparatus comprising:

an application-enabled network device configured to receive an application having instructions compatible with a command-line interface application programming interface (CLI-API), the command-line interface application programming interface configured to work with a command-line interface (CLI) of the non-application enabled network device, an application-enabled network device being a network device that is able to process an application written in a high-level programming language;

a processor associated with the application-enabled network device, the processor configured to execute the application and thereby cause the command-line interface application programming interface to create one or more command-line interface commands wherein the one or more command-line interface commands created by the command-line interface application programming interface are capable of controlling the non-application enabled network device; and a network interface on the application enabled network device that transmits the one or more command-line interface commands created by the command-line interface application programming interface over a network for processing by the non-application enabled network device.

13. The apparatus of claim 12, wherein the CLI commands created on the application-enabled network device are capable of controlling one or more aspect of the operation of the non-application enabled network device.

14. The apparatus of claim 12, wherein the application-enabled network device receives results over the network from the processing of the CLI commands on the non-application enabled network device.

15. The apparatus of claim 12, wherein the application-enabled network device can process Java object-oriented instructions.

* * * * *